United States Patent
Taguchi et al.

[11] Patent Number: 5,951,937
[45] Date of Patent: Sep. 14, 1999

[54] PREPARATION OF OXIDE MAGNETIC MATERIAL

[75] Inventors: Hitoshi Taguchi; Kiyoyuki Masuzawa; Yoshihiko Minachi; Kazumasa Iida, all of Chiba, Japan

[73] Assignee: TDK Corporation, Tokyo, Japan

[21] Appl. No.: 08/984,087

[22] Filed: Dec. 3, 1997

[30] Foreign Application Priority Data

Dec. 3, 1996 [JP] Japan ..................................... 8-337445
Sep. 19, 1997 [JP] Japan ..................................... 9-273934

[51] Int. Cl.$^6$ ................................ H01F 1/10; B28B 3/00
[52] U.S. Cl. .................. 264/427; 252/62.57; 252/62.62; 252/62.63; 264/428; 264/611
[58] Field of Search ................................... 264/427, 428, 264/611; 252/62.57, 62.62, 62.63

[56] References Cited

U.S. PATENT DOCUMENTS

| | | | |
|---|---|---|---|
| 5,164,173 | 11/1992 | Müller | 252/62.51 |
| 5,607,615 | 3/1997 | Taguchi et al. | 252/62.63 |
| 5,648,039 | 7/1997 | Taguchi et al. | 264/428 |
| 5,811,024 | 9/1998 | Taguchi et al. | 252/62.63 |
| 5,846,449 | 12/1998 | Taguchi et al. | 252/62.62 |

FOREIGN PATENT DOCUMENTS 6-53064   2/1994   Japan .
6-112029  4/1994   Japan .

OTHER PUBLICATIONS

Saito, "Molding of Fine Ceramics and Organic Materials," Aug. 26, 1985, pp. 186–191.

Moriyama, "Chemistry of Dispersion and Agglomeration," Jul. 20, 1995, pp. 92–95.

*Primary Examiner*—James Derrington
*Attorney, Agent, or Firm*—Oblon, Spivak, McClelland, Maier & Neustadt, P.C.

[57] ABSTRACT

The method of the invention uses a molding slurry containing a particulate oxide magnetic material and water and having a dispersant added thereto. The dispersant is an organic compound having a hydroxyl group and a carboxyl group or a neutralized salt thereof or a lactone thereof, an organic compound having a hydroxymethylcarbonyl group, or an organic compound having an enol form hydroxyl group dissociable as an acid or a neutralized salt thereof. The organic compound has 3 to 20 carbon atoms, with the hydroxyl group being attached to at least 50% of carbon atoms other than the carbon atom forming a double bond with an oxygen atom. Citric acid or a neutralized salt thereof is also useful as the dispersant. The addition of the dispersant facilitates the wetting of the particulate oxide magnetic material with water and improves the dispersion of primary particles and a degree of orientation upon molding.

12 Claims, 1 Drawing Sheet

PREPARATION OF OXIDE MAGNETIC MATERIAL

BACKGROUND OF THE INVENTION

1. Field of the Invention

This invention relates to a method for preparing oxide magnetic materials such as anisotropic ferrite magnets.

2. Prior Art

At present, hexagonal strontium ferrite and barium ferrite are used as the oxide permanent magnet material. To improve magnetic properties, these magnets are often given anisotropy by pressing in a magnetic field. One of magnetic properties is a residual magnetic flux density or remanence Br. Factors largely affecting the remanence Br have the following relationship. It is noted that a saturation magnetization ($\sigma$s) per unit weight in the following formula is a value intrinsic to a material.

Formula: Br (saturation magnetization per unit weight)×(density)×(degree of orientation)

Therefore, for the manufacture of anisotropic sintered ferrite magnets having high Br, it is very important to increase the sintered density and the degree of orientation. One common practice employed in the prior art for achieving a high degree of orientation is to mold a slurry having ferrite particles dispersed in water, that is, wet molding. For providing high coercivity, on the other hand, it is necessary to reduce the size of ferrite particles to or below the critical single domain diameter of 1 $\mu$m for defining single domains. Such particles have the problem that the degree of orientation generally lowers even when the wet molding technique is used. The probable causes include (1) an increase of magnetic coalescence as a result of dividing particles into single domains, (2) a decrease of torque for particles to orient in a magnetic field direction, and (3) an increase of frictional force due to the increased surface area of particles.

For solving this problem, we found that the magnetic coalescence can be reduced by introducing comminution strains into submicron ferrite particles to temporarily reduce the coercivity thereof (see JP-A 53064/1994).

We further found that by using an organic solvent such as toluene or xylene instead of water and adding a surfactant such as oleic acid, a degree of magnetic orientation of about 98% at maximum is achievable even with submicron ferrite particles (see also JP-A 53064/1994). This method, however, using the organic solvent is detrimental to the human body and the environment, which can be solved by a vast set of recovery and related units, leading to an increased cost.

It is noted that the degree of magnetic orientation used in this specification is a ratio (Ir/Is) of residual magnetization (Ir) to saturation magnetization (Is).

On the other hand, for improving a degree of orientation in the wet magnetic field molding technique using water, it was attempted in the prior art to add a polymeric dispersant as typified by a polycarboxylic acid (or salt) to magnetic particles and allow the dispersant to be adsorbed on the surfaces of magnetic particles whereby the particles are dispersed by virtue of steric hindrance and electrical repulsion, thereby improving a degree of orientation (see JP-A 112029/1994). Nevertheless, the degree of orientation and remanence Br thus accomplished are not so high.

Understandably, the problem that the degree of orientation deteriorates as the particle size decreases arises not only in the manufacture of ferrite magnets, but also when other particulate oxide magnetic materials such as needle soft magnetic ferrite are oriented in a magnetic field.

SUMMARY OF THE INVENTION

An object of the present invention is to provide a method of preparing oxide magnetic materials such as anisotropic ferrite magnets wherein an oxide magnetic material having a high degree of orientation is obtained by improving the orientation in a magnetic field upon wet molding using water which is advantageous from the environmental and economical standpoints.

This and other objects are attained by the present invention which is defined below as (1) to (12).

(1) A method for preparing an oxide magnetic material comprising the molding step of wet molding a molding slurry containing a particulate oxide magnetic material and water in a magnetic field into a molded part, wherein the molding slurry having a dispersant added thereto is used, said dispersant comprising an organic compound having a hydroxyl group and a carboxyl group or a neutralized salt thereof or a lactone thereof, an organic compound having a hydroxymethylcarbonyl group, or an organic compound having an enol form hydroxyl group dissociable as an acid or a neutralized salt thereof, said organic compound having 3 to 20 carbon atoms, the hydroxyl group being attached to at least 50% of carbon atoms other than the carbon atom forming a double bond with an oxygen atom.

(2) A method for preparing an oxide magnetic material according to (1) wherein said organic compound having a hydroxyl group and a carboxyl group is gluconic acid.

(3) A method for preparing an oxide magnetic material according to (1) wherein said organic compound having an enol form hydroxyl group dissociable as an acid is ascorbic acid.

(4) A method for preparing an oxide magnetic material comprising the molding step of wet molding a molding slurry containing a particulate oxide magnetic material and water in a magnetic field into a molded part, wherein the molding slurry having citric acid or a neutralized salt thereof added thereto as a dispersant is used.

(5) A method for preparing an oxide magnetic material according to any one of (1) to (4) wherein a basic compound has been added to said molding slurry.

(6) A method for preparing an oxide magnetic material according to any one of (1) to (4) wherein said dispersant is a calcium salt.

(7) A method for preparing an oxide magnetic material according to any one of (1) to (6) further comprising a wet comminution step prior to the molding step.

(8) A method for preparing an oxide magnetic material according to (7) wherein at least a portion of said dispersant is added in said wet comminution step.

(9) A method for preparing an oxide magnetic material according to (7) or (8) further comprising a dry coarse comminution step prior to the wet comminution step.

(10) A method for preparing an oxide magnetic material according to (9) wherein at least a portion of said dispersant is added in said dry coarse comminution step.

(11) A method for preparing an oxide magnetic material according to any one of (1) to (10) wherein the amount of said dispersant added, which is calculated as an ion if the dispersant is ionizable in an aqueous solution, is 0.05 to 3.0% by weight of said particulate oxide magnetic material.

(12) A method for preparing an oxide magnetic material according to any one of (1) to (11) wherein said particulate oxide magnetic material has a mean particle size of not greater than 1 $\mu$m.

We conceived that a degree of orientation can be increased by causing a compound having a highly hydrophilic group such as gluconic acid to be adsorbed to the surfaces of oxide magnetic material particles so that the surfaces of oxide magnetic material particles are rendered more hydrophilic for improving their wetting with water, thereby improving the dispersion of primary particles. Based on this conception, we have attempted to add the dispersant to the molding slurry, thereby accomplishing a high degree of orientation approximate to that achieved with organic solvents.

Most of polymeric dispersants used thus far are artificial synthesized ones which are less bio-degradable, imposing the problem of disposal of used solution. In contrast, most of the dispersants used in the present invention are naturally occurring ones which are safe to the human body and the environment and have the additional advantage of bio-degradation.

Among the dispersants used herein, those compounds which are acknowledged to be especially effective for increasing a degree of orientation are, for example, hydroxycarboxylic acids such as gluconic acid, neutralized salts thereof, and lactones thereof. Though falling in the class of hydroxycarboxylic acids, glycolic acid (C=2; OH=1; COOH=1) is not effective. Besides, ascorbic acid (C=6; OH=4) was found effective like the hydroxycarboxylic acids. Specifically stated, in an example wherein submicron ferrite particles are wet comminuted using water as a dispersing medium, molded and sintered, the degree of magnetic orientation is 93 to 94% when no dispersants are added and about 94% when polycarboxylic acid type compounds conventionally used as the dispersant are used, but increases to 95 to 97% when gluconic acid is used as the dispersant. Since a degree of magnetic orientation of 97 to 98% is accomplished by using an organic solvent (xylene) as the dispersing medium and oleic acid as the dispersant, the present invention is successful in accomplishing a high degree of magnetic orientation approximate to that achieved with organic solvents, despite the use of water as the dispersing medium.

When dispersants (e.g., hydroxycarboxylic acids) exhibiting acidic nature in an aqueous solution are used in the present invention, a higher degree of orientation is accomplished by adding a basic compound to the slurry to increase the pH of the slurry supernatant.

In the process of producing ferrite magnets, $SiO_2$ and $CaCO_3$ are added as auxiliary components. When a hydroxycarboxylic acid or a lactone thereof is used as the dispersant, the $SiO_2$ and $CaCO_3$ are partially carried away in the steps of preparing and wet molding the molding slurry. The carry-away amount increases when the basic compound is added for pH adjustment in addition to the hydroxycarboxylic acid or lactone. In contrast, the use of a calcium salt of a hydroxycarboxylic acid as the dispersant is effective for preventing $SiO_2$ and $CaCO_3$ from being carried away and restraining the deterioration of HcJ and other characteristics thereby.

Among the dispersants used herein, tartaric acid, l-ascorbic acid and citric acid are known as the dispersant intended for improving moldability in the slip casting technique (see Katsuyoshi Saito, "Molding of Fine Ceramics and Organic Materials," CMC K.K., pages 187–188). The dispersants are classified therein into 12 classes, one of which includes polycarboxylic acid type anionic surfactants which are less effective for improving a degree of orientation. Another class includes organic acids, citric acid, tartaric acid and l-ascorbic acid while all organic acids are not effective for the present invention. In fact, succinic acid having a relatively close structure to tartaric acid is not effective at all for improving a degree of orientation and does fall outside the scope of the invention. There is not contained the restrictive description that acids having more hydroxyl groups in a molecule are effective as in the present invention. The present invention is characterized in that those dispersants which are especially effective for improving the degree of orientation of oxide magnetic materials are selected from the well-known dispersants which are used in the slip casting technique for improving moldability.

Also, among the dispersants used herein, sodium gluconate is known as the dispersant in the concrete industry (see Noboru Moriyama, "Chemistry of Dispersion and Agglomeration," Sangyo Tosho K.K., pages 92–95). The addition of the dispersant in the concrete industry, however, is intended to improve fluidity and to reduce water for strength improvement and is not pertinent to the molding in a magnetic field of oxide magnetic materials, which requires spinning of magnetic material particles, and the improvement in degree of orientation during molding. When commercially available high performance water reducing agents are applied to the preparation of oxide magnetic materials, few are effective for improving a degree of orientation, and to a less extent even if effective.

DESCRIPTION OF THE PREFERRED EMBODIMENTS

Figure 1:
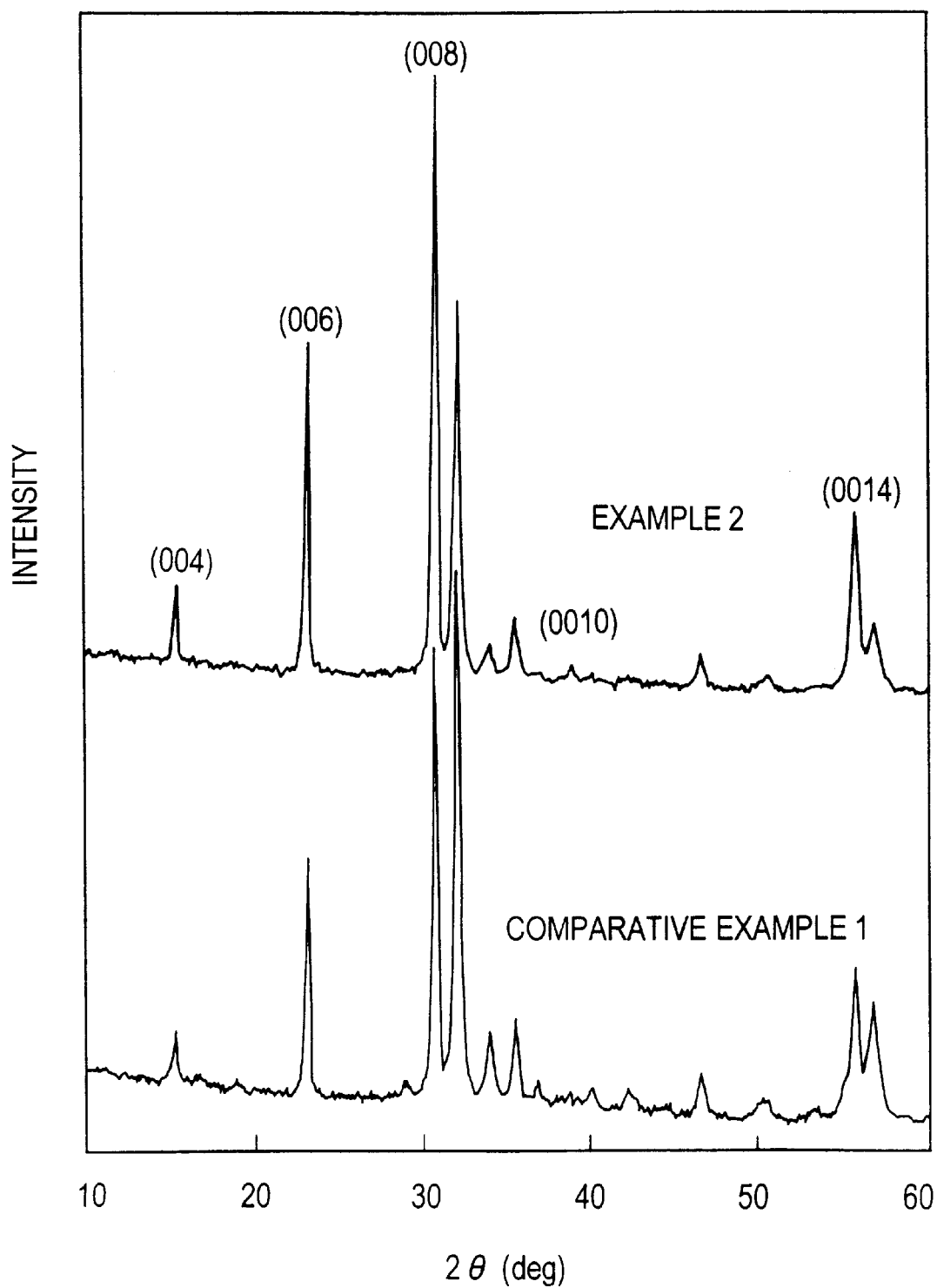
FIG. 1 is an X-ray diffraction chart for examining the degree of orientation of molded parts.

Although the present invention is applicable to the preparation of various oxide magnetic materials, the invention is described below as being applied to the preparation of anisotropic ferrite magnets because of outstanding advantages obtained therefrom.

The anisotropic ferrite magnets to which the invention is applied are, in most cases, hexagonal ferrite materials of the magnetoplumbite type having M, W and other phases. These ferrites are preferably represented by $MO.nFe_2O_3$ wherein M is preferably at least one of strontium and barium and n is from 4.5 to 6.5. These ferrites may further contain rare earth elements, Ca, Pb, Si, Al, Ga, Sn, Zn, In, Co, Ni, Ti, Cr, Mn, Cu, Ge, Nb, Zr, etc.

More preferred are magnetic materials having as the primary phase a hexagonal magnetoplumbite type (M type) ferrite in which the proportions of the respective metal elements A, R, Fe and L to the total of the metal elements are:

A: 1 to 13 at %,
R: 0.05 to 10 at %,
Fe: 80 to 95 at %, and
L: 0.1 to 5 at % wherein A is at least one element selected from strontium, barium, calcium, and lead, R is at least one element selected from rare earth elements (inclusive of yttrium) and bismuth, and L is cobalt and/or zinc.

In this embodiment, the magnetic material preferably forms the primary phase represented by the formula (I):

$$A_{1-x}R_x(Fe_{12-y}L_y)_zO_{19} \tag{I}$$

wherein x, y, and z are values calculated from the above-defined quantities, provided that R is located at the site of A and L is located at the site of Fe.

The more preferred proportions of the respective metal elements are:

A: 3 to 11 at %,
R: 0.2 to 6 at %,
Fe: 83 to 94 at %, and
L: 0.3 to 4 at %, and especially A: 3 to 9 at %,
R: 0.5 to 4 at %,
Fe: 86 to 93 at %, and
L: 0.5 to 3 at %.

Among the above-described constituent elements, A is at least one element selected from strontium, barium, calcium, and lead, and preferably always contains strontium. A too lower proportion of A will not form M type ferrite or will form more non-magnetic phases such as $\alpha\text{-}Fe_2O_3$. A too higher proportion of A will not form M type ferrite or will form more non-magnetic phases such as $SrFeO_{3-x}$. The proportion of strontium in A is preferably at least 51 at %, more preferably at least 70 at %, most preferably 100 at %. If the proportion of strontium in A is too low, improvements in both saturation magnetization and coercivity may not be obtainable.

R is at least one element selected from rare earth elements (inclusive of yttrium) and bismuth. Preferably R contains lanthanum, praseodymium or neodymium, and especially always contains lanthanum. A too lower proportion of R will form a smaller amount of solid solution of M, encountering difficulty in achieving the effect of R. A too higher proportion of R will form more non-magnetic hetero phases such as ortho-ferrite. The proportion of lanthanum in R is preferably at least 40 at %, more preferably at least 70 at %, with the sole use of lanthanum as R being most preferred for improving the saturation magnetization. This is because lanthanum has the highest extent of solid solution when the extent of solid solution with hexagonal M type ferrite is compared. Accordingly, if the proportion of lanthanum in R is too low, the amount of solid solution of R cannot be increased and as a result, the amount of solid solution of element L cannot be increased, resulting in the reduced effect of L. The combined use of bismuth is advantageous in productivity since the calcining and sintering temperatures become lower.

The element L is cobalt and/or zinc and preferably always contains cobalt. The proportion of cobalt in L is preferably at least 10 at %, more preferably at least 20 at %. A too low proportion of cobalt will provide an insufficient improvement in coercivity.

The anisotropic ferrite sintered magnet described above is prepared by mixing source oxides of the ferrite composition or compounds which will convert into oxides upon firing, and calcining the mixture. Calcination may be carried out in air, for example, at 1,000 to 1,350° C. for 1 second to 10 hours and at 1,000 to 1,200° C. for 1 second to 3 hours if it is desired to produce fine calcined powder of M type strontium ferrite.

The thus calcined powder has a substantially magnetoplumbite ferrite structure and consists of granular particles, with the primary particles preferably having a mean particle size of 0.1 to 1 μm, especially 0.1 to 0.5 μm. The mean particle size, which may be determined from an observation under a scanning electron microscope (SEM), usually has a coefficient of variation CV of up to 80%, especially 10 to 70%. Also preferably, the calcined powder has a saturation magnetization σs of 65 to 80 emu/g, especially 65 to 71.5 emu/g for M type strontium ferrite, and a coercive force HcJ of 2,000 to 8,000 Oe, especially 4,000 to 8,000 Oe for M type strontium ferrite.

The invention carried out wet molding using a molding slurry containing a particulate oxide magnetic material, water as a dispersing medium, and a dispersant. To enhance the action of the dispersant, a wet comminution (or milling) step is preferably carried out prior to the wet molding step. Also, when the particulate oxide magnetic material used is calcined particles, which are usually granular, a dry coarse comminution (or pulverizing) step is preferably provided prior to the wet comminution step for pulverizing or disintegrating the calcined particles. When the particulate oxide magnetic material is prepared by a co-precipitation or hydrothermal synthetic process, the dry coarse comminution step is usually omitted and the wet comminution step is not essential although the wet comminution step is preferably provided in order to enhance the degree of orientation. In the following description, reference is made to the embodiment wherein calcined particles are used as the particulate oxide magnetic material and both the dry coarse comminution step and the wet comminution step are employed.

In the dry coarse comminution step, comminution is continued until the BET specific surface area is increased by a multiplicative factor of about 2 to about 10. At the end of comminution, the particles preferably have a mean particle size of about 0.1 to 1 μm and a BET specific surface area of about 4 to 10 $m^2/g$ while the coefficient of variation CV of the particle size is preferably maintained at 80% or lower, especially 10 to 70%. The comminution means is not critical. Dry vibration mills, dry attritors (medium agitation mills), and dry ball mills are useful, with the dry vibration mills being preferred. The comminution time may be properly determined in accordance with a particular comminution means.

The dry coarse comminution is also effective for reducing coercivity HcB by introducing lattice strains into the calcined particles. The reduced coercivity restrains the coalescence of particles, resulting in improved dispersion and an improved degree of orientation. The lattice strains introduced into particles are relieved in the subsequent sintering step whereby the material resumes the intrinsic hard magnetism, becoming a permanent magnet.

In the dry coarse comminution step, $SiO_2$ and $CaCO_3$ which will convert to CaO upon firing are usually added. Part of $SiO_2$ and $CaCO_3$ may be added prior to calcination whereupon some improvements in characteristics are acknowledged.

Following the dry comminution, a slurry containing the calcined particles and water is prepared and subjected to wet comminution. The content of calcined particles in the slurry to be milled is preferably about 10% to about 70% by weight. The comminution means used in wet comminution is not critical. Usually, ball mills, attritors, and vibration mills are useful. The comminution time may be properly determined in accordance with a particular comminution means.

At the end of wet comminution, the comminuted slurry is concentrated into a molding slurry. Concentration may be done as by centrifugation. The content of calcined particles in the molding slurry is preferably about 60% to about 90% by weight.

In the wet molding step, the molding slurry is molded in a magnetic field. The molding pressure may be about 0.1 to 0.5 $ton/cm^2$ and the applied magnetic field may be about 5 to 15 kOe.

The present invention uses the molding slurry to which the dispersant is added. The dispersant used herein is an organic compound having a hydroxyl group and a carboxyl group or a neutralized salt thereof or a lactone thereof, an organic compound having a hydroxymethylcarbonyl group, or an organic compound having an enol form hydroxyl group dissociable as an acid or a neutralized salt thereof.

These organic compounds have 3 to 20 carbon atoms, preferably 4 to 12 carbon atoms. The hydroxyl group is attached to at least 50% of carbon atoms other than the carbon atom forming a double bond with an oxygen atom. If the number of carbon atoms is 2 or less, the advantages of the invention are lost. Even with 3 or more carbon atoms, the advantages of the invention are lost if the percent attachment of hydroxyl groups to carbon atoms other than the carbon atom forming a double bond with an oxygen atom is less than 50%. The percent attachment of hydroxyl groups is limited with respect to the organic compound, but not with respect to the dispersant. For example, when the dispersant used is a lactone of an organic compound having a hydroxyl group and a carboxyl group (i.e., a hydroxycarboxylic acid), the limitation of the percent attachment of hydroxyl groups is imposed to the hydroxycarboxylic acid itself, but not to the lactone.

The basic skeleton of the organic compound may be either linear or cyclic and either be saturated or contain an unsaturated bond.

More illustratively, the preferred dispersants are hydroxycarboxylic acids or neutralized salts thereof or lactones thereof, especially gluconic acid (C=6; OH=5; COOH=1) or a neutralized salt or lactone thereof, lactobionic acid (C=12; OH=8; COOH=1), tartaric acid (C=4; OH=2; COOH=2) or neutralized salts thereof, and glucoheptonic acid γ-lactone (C=7; OH=5). Among these, gluconic acid or a neutralized salt or lactone thereof is desirable because it is more effective for improving the degree of orientation and inexpensive.

Preferred among the organic compounds having a hydroxymethylcarbonyl group is sorbose.

Preferred among the organic compounds having an enol form hydroxyl group dissociable as an acid is ascorbic acid.

Citric acid or a neutralized salt thereof is also useful as the dispersant in the practice of the invention. Citric acid has hydroxyl groups and carboxyl groups, but does not satisfy the requirement that the hydroxyl group is attached to at least 50% of carbon atoms other than the carbon atom forming a double bond with an oxygen atom. Nevertheless, citric acid was found effective for improving the degree of orientation.

Some of the preferred dispersants are illustrated below by their structure.

D-gluconic acid

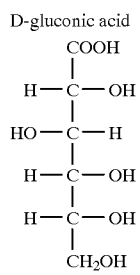

α-D-glucoheptonic acid
γ-lactone

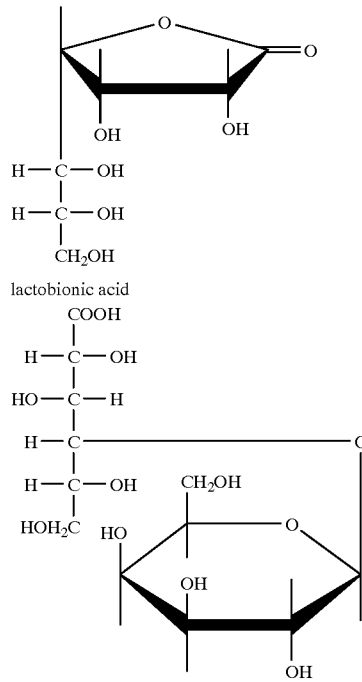

lactobionic acid (R,R)-tartaric acid

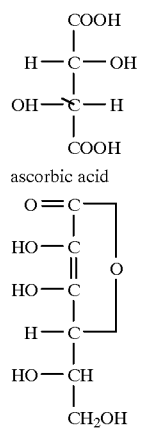

ascorbic acid

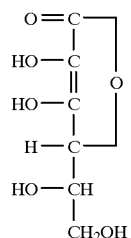

L-(-)-sorbose

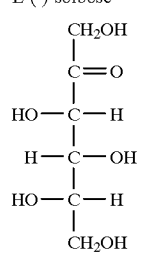

There is a possibility that the dispersant used herein change its structure during comminution and slurry preparation. For example, free gluconic acid and two γ- and δ-lactones thereof do not individually exist in an aqueous solution, but in a mixed state because each of them changes to the other two. Moreover, the dispersant can change its structure through mechanochemical reaction provided by comminution.

Furthermore, the objects of the invention can be attained by adding a compound which will form the same organic compound as the dispersant used herein, for example, through hydrolysis reaction.

The degree of orientation achieved by the magnetic field orientation is affected by the pH of the slurry. More particularly, a too low pH value leads to a lower degree of orientation, by which the remanence of the sintered material is affected. The slurry has low pH when a compound which exhibits acidic nature in an aqueous solution, for example, a hydroxycarboxylic acid is used as the dispersant. Then, it is preferred to adjust the pH of the slurry by adding a basic compound along with the dispersant, for example. The basic compound is preferably ammonia or sodium hydroxide. Ammonia may be added as aqueous ammonia. It is understood that the pH lowering can be prohibited by using a sodium salt of hydroxycarboxylic acid.

In the case of ferrite magnets and analogues wherein $SiO_2$ and $CaCO_3$ are added as auxiliary components, if a hydroxycarboxylic acid or lactone thereof is used as the dispersant, the $SiO_2$ and $CaCO_3$ are carried away along with the supernatant of a molding slurry mainly during the preparation thereof, with the risk that desired characteristics are not obtained on account of a drop of HcJ. When the slurry is given higher pH as by adding the basic compound, the amounts of $SiO_2$ and $CaCO_3$ carried away are increased. In this regard, the leaching of $SiO_2$ and $CaCO_3$ is suppressed by using a calcium salt of hydroxycarboxylic acid as the dispersant. It is understood that when the basic compound is added or a sodium salt is used as the dispersant, the shortage of $SiO_2$ and $CaCO_3$ in the final magnet can be compensated for by adding $SiO_2$ and $CaCO_3$ in excess of the desired composition. It is noted that little leaching of $SiO_2$ and $CaCO_3$ is found when ascorbic acid is used.

For the above-described reason, the supernatant of the slurry is preferably at pH 7 or higher, more preferably at pH 8 to 11.

The type of the neutralized salt used as the dispersant is not critical. It may be any of calcium, sodium and other salts although the calcium salt is preferred for the above-described reason.

Understandably, a mixture of two or more dispersants may be used.

The amount of the dispersant added is preferably 0.05 to 3.0% by weight, more preferably 0.1 to 2.0% by weight based on the weight of the calcined particles used as the particulate oxide magnetic material. A too smaller amount of the dispersant would achieve an insufficiently improved degree of orientation whereas with a too larger amount of the dispersant, the molded part or sintered body would become likely to crack.

It is noted that if the dispersant is a compound which is ionizable in an aqueous solution, for example, an acid or metal salt, the amount of the dispersant added is calculated as an ion. That is, the addition amount is determined by converting to an organic component excluding hydrogen ion or metal ion. Also, where the dispersant is a hydrate, the addition amount is determined after water of crystallization is excluded. For example, where the dispersant is calcium gluconate monohydrate, the addition amount is calculated as gluconate ion.

Further, where the dispersant is a lactone or contains a lactone, the addition amount is calculated as hydroxycarboxylate ion provided that all lactone molecules open their ring and convert to hydroxycarboxylic acid.

The stage when the dispersant is added is not critical. The dispersant may be added at the dry coarse comminution step or during the preparation of a slurry to be milled in the wet comminution step, or part of the dispersant may be added at the dry coarse comminution step and the remainder added at the wet comminution step. Alternatively, the dispersant may be added at the wet comminution step as by agitation. In any case, the dispersant becomes present in the molding slurry, ensuring that the advantages of the invention are achievable. Understandably, the addition of the dispersant during comminution, especially dry coarse comminution is more effective for improving the degree of orientation. As compared with the ball mill or analogues used in wet comminution, the vibration mill or analogues used in dry coarse comminution imparts more energy to particles and brings the temperature of particles to a higher level to establish a state that chemical reaction is more likely to take place. It is thus believed that if the dispersant is added in the dry coarse comminution step, the amount of the dispersant adsorbed to the surfaces of particles is increased, resulting in a higher degree of orientation. In fact, when the amount of the dispersant remaining in the molding slurry (which is believed approximately equal to the adsorption amount) is measured, a higher ratio of the residual amount to the addition amount is obtained when the dispersant is added in the dry coarse comminution step than when the dispersant is added in the wet comminution step. It is noted that when the dispersant is added in divided portions, the addition amounts of the respective portions are determined so that the total of the addition amounts may fall in the preferred range described above.

At the end of the molding step, the molded part is heat treated at a temperature of 100 to 500° C. in air or nitrogen whereby the dispersant added is thoroughly decomposed and removed. In the subsequent firing step, the molded part is sintered preferably at a temperature of 1,150 to 1,250° C., more preferably 1,160 to 1,220° C. for about ½ to about 3 hours, obtaining an anisotropic ferrite magnet.

There has been described the embodiment wherein the invention is applied to the preparation of anisotropic ferrite magnets. Even when the invention is applied to the preparation of other oxide magnetic materials such as soft magnetic ferrite sintered bodies using acicular ferrite particles or the like, for example, the dispersion of oxide magnetic material particles in the molding slurry is improved by adding the dispersant in line with the above teaching and eventually, oxide magnetic materials having a higher degree of orientation are obtainable.

When the sintered ferrite magnets prepared by the method of the invention are used, the following advantages are generally obtained so that excellent applied products are obtainable. More particularly, provided that applied products are of the same shape as conventional ferrite products, the magnets, which generate a more magnetic flux density, contribute to improvements in performance of the products, for example, the achievement of higher torque in the case of motors, and the achievement of sound quality with improved linearity due to the strengthened magnetic circuit in the case of speakers or headphones. Also, if applied products may have the same function as the prior art products, the dimensions (thickness) of magnets can be reduced (thinner), contributing to size and weight reductions (flattening).

The sintered ferrite magnets prepared by the method of the invention will find a wide variety of applications as described below after they are worked to the desired shape.

The magnets are advantageously used in automotive motors for fuel pumps, power windows, ABS, fans, wipers, power steering, active suspensions, starters, door locks and mirrors; motors for business machines and audio-visual equipment such as FDD spindles, VCR capstans, VCR rotary heads, VCR reels, VCR loading, VCR camera capstans, VCR camera rotary heads, VCR camera zoom, VCR camera focus, tape cassette capstans, CD, LD, and MD drive spindles, CD, LD and MD loading, CD and LD optical pickups; motors for household appliances such as air conditioner compressors, refrigerator compressors, electric tools, fans, microwave oven fans, microwave oven plate rotation, mixer driving, dryer fans, shaver driving, and power toothbrushes; motors for factory automation equipment such as robot shafts, connection drives, robot drives, machine tool table drives, and machine tool belt drives; and miscellaneous units including motorcycle generators, speaker magnets, headphone magnets, magnetron tubes, MRI magnetic field generating systems, CD-ROM clamps, distributor sensors, ABS sensors, fuel/oil level sensors, and magnet latches.

EXAMPLE

Examples of the invention are given below by way of illustration.

It is noted that among the dispersants used in Examples, the gluconic acid used was a commercially available 50% aqueous solution and for the remainder, commercially available reagents were used without further treatment.

Example 1

To achieve the desired composition:

$$Sr_{0.85}La_{0.15}Zn_{0.15}Fe_{11.85}O_{19},$$

the starting raw materials shown below were used.

| | |
|---|---|
| $Fe_2O_3$ powder (containing Mn, Cr, Si and Cl impurities) | 15.00 kg |
| $SrCO_3$ powder (containing Ba and Ca impurities) | 2067.3 g |
| ZnO powder | 201.5 g |
| $La_2O_3$ powder | 399.6 g |
| The following additives were used. | |
| $SiO_2$ | 34.5 g |
| $CaCO_3$ | 25.8 g |

The starting raw materials and additives were comminuted in a wet attritor, dried, classified, and then fired in air at 1,230° C. for 3 hours, yielding a granular calcined material.

The calcined material was measured for magnetic properties by means of a vibrating sample magnetometer (VSM), finding a saturation magnetization σs of 72 emu/g and a coercive force HcJ of 4.0 kOe.

To the calcined material were added 0.4% by weight of $SiO_2$ and 1.05% by weight of $CaCO_3$. The mixture was subject to dry coarse comminution in a vibrating rod mill with a capacity of 110 g per batch for 20 minutes. At this point, comminution introduced strains into the calcined particles to reduce their HcJ to 1.7 kOe.

The calcined particles were then mixed with water as a dispersing medium and gluconic acid as a dispersant to form a slurry to be milled. Upon addition of gluconic acid, aqueous ammonia was also added in an amount of corresponding to 5 times the neutralization equivalent of gluconic acid for adjusting the pH of the mixture during comminution. The slurry to be milled had a solid concentration of 34% by weight. The amount of gluconic acid added to the calcined particles is shown in Table 1. The addition amount of gluconic acid shown in Table 1 is a value calculated as gluconate ion as previously described and the same applies to ionizable dispersants in the following Examples.

The slurry to be milled was subject to wet comminution in a ball mill for 40 hours. At the end of wet comminution, a specific surface area of 8.5 m$^2$/g (mean particle size of 0.5 μm) was reached. The supernatant of the slurry at the end of wet comminution had a pH value shown in Table 1.

After the completion of wet comminution, the comminuted slurry was centrifuged and adjusted until the concentration of calcined particles in the slurry reached 78% by weight, obtaining a molding slurry. The molding slurry was compression molded while removing water therefrom. This molding was carried out under a magnetic field of about 13 kOe applied in a compression direction. The molded part was a cylindrical one having a diameter of 30 mm and a height of 18 mm.

Since the degree of magnetic orientation of the molded part is also affected by the density thereof, X-ray diffractometry analysis was carried out on the surface of the molded part. The degree of crystallographic orientation (or degree of orientation by X-ray) of the molded part was determined from the face index and intensity of the peaks that appeared in the diffractometry. The results are shown in Table 1. The degree of magnetic orientation of the sintered part is dictated by the degree of orientation by x-ray of the molded part to a considerable extent. It is noted that the degree of orientation by X-ray is represented by ΣI(00L)/ΣI(hkL) in this specification. (00L) is a general expression representing c faces such as (004) and (006), and ΣI(00L) is the total of peak intensities of all (00L) faces. (hkL) represents all detected peaks and ΣI(hkL) is the total of intensities thereof. Therefore, ΣI(00L)/ΣI(hkL) represents the extent of c-face orientation.

Next, the molded parts were fired in air at 1,200° C. or 1,220° C. for one hour. It is noted that the molded part was fully burned out at 100 to 360° C. in air to remove the gluconic acid before firing. The sintered parts thus obtained were measured for remanence Br, coercive force HcJ, degree of orientation Ir/Is, squareness ratio Hk/HcJ, and sintered density, with the results shown in Table 2. It is noted that Hk is the intensity of an external magnetic field at which the magnetic flux density in the second quadrant of the magnetic hysteresis loop reaches 90% of the remanence. With low values of Hk, high energy products are not obtainable. Hk/HcJ is an index of magnet performance and represents the degree of squareness in the second quadrant of the magnetic hysteresis loop.

Example 2

Molded parts and sintered parts were obtained as in Example 1 except that gluconic acid was added in the dry coarse comminution step. It is noted that aqueous ammonia was added in the wet comminution step as in Example 1. The molded parts and sintered parts were measured as in Example 1. The results are shown in Tables 1 and 2.

Comparative Example 1

Molded parts and sintered parts were obtained as in Examples 1 and 2 except that no gluconic acid was added. The molded parts and sintered parts were measured as in Example 1. The results are shown in Tables 1 and 2.

TABLE 1

| Dispersant | Addition amount (wt %) | Addition stage | Slurry supernatant pH | Degree of orientation by X-ray of molded part, $\Sigma I(00L)/\Sigma I(hkL)$ |
| --- | --- | --- | --- | --- |
| CE1 | — | — | 9 | 0.49 |
| E1 | gluconic acid | 1.0 | wet comminution step | 10 | 0.60 |
| E2 | gluconic acid | 1.0 | dry coarse comminution step | 10 | 0.65 |

It is evident from Table 1 that the degree of orientation by X-ray of a molded part is improved by adding gluconic acid and that a more improvement in degree of orientation is achieved by adding gluconic acid in the dry coarse comminution step than in the wet comminution step. FIG. 1 shows X-ray diffraction charts of the molded parts of Comparative Example 1 and Example 2.

TABLE 2

|  | Firing temp. (° C.) | Br (G) | HcJ (Oe) | Ir/Is (%) | Hk/HcJ (%) | Density (g/cm³) |
| --- | --- | --- | --- | --- | --- | --- |
| CE1 | 1200 | 4220 | 3400 | 92.7 | 94.7 | 5.03 |
|  | 1220 | 4310 | 3130 | 93.7 | 59.9 | 5.07 |
| E1 | 1200 | 4330 | 3300 | 96.2 | 93.8 | 5.00 |
|  | 1220 | 4390 | 3100 | 96.6 | 92.7 | 5.03 |
| E2 | 1200 | 4410 | 3230 | 96.8 | 95.7 | 5.02 |
|  | 1220 | 4450 | 3000 | 97.1 | 94.9 | 5.05 |

It is evident from Table 2 that a higher degree of magnetic orientation and a higher Br value are accomplished by adding gluconic acid, especially in the dry coarse comminution step.

It is noted that when the amount of gluconic acid in the comminuted material was measured by TG-DTA after removing the dispersing medium from the wet comminuted slurry and drying the comminuted material, the amount of gluconic acid in the comminuted material was 0.28% by weight in Example 1 where gluconic acid was added in the wet comminution step, but 0.40% by weight in Example 2 where gluconic acid was added in the dry coarse comminution step. This demonstrates that the addition of gluconic acid in the dry coarse comminution step results in a higher percent adsorption of gluconic acid.

Examples 3–10 and Comparative Examples 2–3

Molded parts were obtained as in Example 1 except that dry coarse comminution was carried out for 55 minutes using a vibrating ball mill with a capacity of 12 kg per batch and the dispersants shown in Table 3 were used. It is noted that the addition of aqueous ammonia in the wet comminution step was omitted in Example 5 (calcium gluconate monohydrate) and Example 10 (L(-)-sorbose). The molded parts were measured as in Example 1, with the results shown in Table 3.

Next, the molded parts were fired as in Example 1. The sintered parts were measured as in Example 1, with the results shown in Table 4.

TABLE 2

|  | Dispersant | Addition amount (wt %) | Addition stage | Degree of orientation by X-ray of molded part, $\Sigma I(00L)/\Sigma I(hkL)$ |
| --- | --- | --- | --- | --- |
| E3 | gluconic acid | 0.6 | wet comminution step | 0.58 |
| E4 | gluconic acid | 1.0 | wet comminution step | 0.58 |
| E5 | calcium gluconate monohydrate | 0.6 | wet comminution step | 0.54 |
| E6 | α-D-glucoheptonic acid γ-lactone | 0.5 | wet comminution step | 0.62 |
| E7 | lactobionic acid | 2.0 | wet comminution step | 0.61 |
| E8 | L(+)-tartaric acid | 1.0 | wet comminution step | 0.56 |
| E9 | L(+)-ascorbic acid | 1.0 | wet comminution step | 0.59 |
| E10 | L(-)-sorbose | 1.0 | wet comminution step | 0.53 |
| CE2 | — | — | — | 0.50 |
| CE3 | glycolic acid | 1.0 | wet comminution step | 0.50 |

It is evident from Table 3 that these dispersants are also fully effective for improving the degree of orientation.

TABLE 4

|  | Firing temp. (° C.) | Br (G) | HcJ (Oe) | Ir/Is (%) | Hk/HcJ (%) | Density (g/cm³) |
| --- | --- | --- | --- | --- | --- | --- |
| E3 | 1200 | 4390 | 3170 | 96.4 | 93.7 | 5.01 |
|  | 1220 | 4450 | 2950 | 96.5 | 93.4 | 5.05 |
| E4 | 1200 | 4390 | 3170 | 96.0 | 95.8 | 5.01 |
|  | 1220 | 4490 | 2940 | 96.8 | 93.5 | 5.05 |
| E5 | 1200 | 4370 | 3430 | 96.1 | 93.8 | 5.03 |
|  | 1220 | 4410 | 3140 | 96.5 | 75.5 | 5.05 |
| E6 | 1200 | 4400 | 3250 | 95.8 | 95.1 | 5.03 |
|  | 1220 | 4460 | 2980 | 96.6 | 91.3 | 5.06 |
| E7 | 1200 | 4430 | 3180 | 96.3 | 95.3 | 5.05 |
|  | 1220 | 4460 | 2920 | 96.6 | 89.8 | 5.06 |
| E8 | 1200 | 4350 | 3390 | 95.0 | 95.1 | 5.02 |
|  | 1220 | 4420 | 3120 | 95.8 | 91.2 | 5.05 |
| E9 | 1200 | 4370 | 3420 | 95.1 | 95.1 | 5.03 |
|  | 1220 | 4420 | 3130 | 95.5 | 77.9 | 5.06 |
| E10 | 1200 | 4330 | 3430 | 95.5 | 93.8 | 5.04 |
|  | 1220 | 4420 | 3020 | 96.1 | 50.8 | 5.07 |
| CE2 | 1200 | 4260 | 3340 | 93.4 | 96.3 | 5.05 |
|  | 1220 | 4320 | 3090 | 94.1 | 69.7 | 5.06 |
| CE3 | 1200 | 4260 | 3400 | 94.0 | 94.6 | 5.06 |
|  | 1220 | 4340 | 3130 | 95.0 | 63.9 | 5.08 |

It is evident from Table 4 that when the dispersants shown above are used, there are obtained sintered parts having improved magnetic properties and a high degree of orientation. A comparison of Example 4 (using a vibrating ball mill) with Example 1 (using a vibrating rod mill) reveals that the magnetic properties of sintered parts are affected by different dry comminution conditions.

After the molding slurry used in Example 5 was heat treated at 1,000° C. for one hour, the contents of $SiO_2$ and CaO were measured. For comparison purposes, similar measurement was done on the molding slurry used in Comparative Example 2 where no dispersant was added and the molding slurry used in Example 3 where aqueous ammonia was added. The results are shown in Table 5. The supernatant of the slurry at the end of wet comminution in each Example had a pH value shown in Table 5.

TABLE 5

| | | Slurry supernatant | Contents (wt %) in molding slurry | |
|---|---|---|---|---|
| | Dispersant | pH | $SiO_2$ | CaO |
| CE2 | none | 9 | 0.56 | 0.66 |
| E3 | gluconic acid | 10 | 0.47 | 0.44 |
| E5 | calcium gluconate monohydrate | 9 | 0.55 | 0.65 |

It is evident from Table 5 that $SiO_2$ and $CaCO_3$ were carried away in Example 3 where aqueous ammonia was added along with gluconic acid, whereas their leaching was substantially completely inhibited in Example 5 where the calcium salt of gluconic acid was used.

Example 11

Molded parts and sintered parts were obtained as in Example 2 except that the amount of calcium gluconate monohydrate added was changed as shown in Tables 6 and 7 and no aqueous ammonia was added. These parts were measured as in Example 1, with the results shown in Tables 6 and 7.

TABLE 6

Example 11 (dispersant: calcium gluconate monohydrate)

| Addition amount (wt %) | Addition stage | Degree of orientation by X-ray of molded part, $\Sigma I(00L)/\Sigma I(hkL)$ |
|---|---|---|
| 0 | dry coarse comminution step | 0.49 |
| 0.05 | dry coarse comminution step | 0.52 |
| 0.1 | dry coarse comminution step | 0.53 |
| 0.2 | dry coarse comminution step | 0.52 |
| 0.3 | dry coarse comminution step | 0.53 |
| 0.6 | dry coarse comminution step | 0.56 |
| 0.9 | dry coarse comminution step | 0.57 |
| 1.2 | dry coarse comminution step | 0.56 |
| 3.0 | dry coarse comminution step | 0.58 |

TABLE 7

Example 11 (dispersant: calcium gluconate monohydrate)

| Addition amount (wt %) | Firing temp. (° C.) | Br (G) | HcJ (Oe) | Ir/Is (%) | Hk/HcJ (%) | Density (g/cm³) |
|---|---|---|---|---|---|---|
| 0 | 1200 | 4220 | 3400 | 92.7 | 94.7 | 5.03 |
| | 1220 | 4310 | 3130 | 93.7 | 59.9 | 5.07 |
| 0.05 | 1200 | 4320 | 3450 | 93.2 | 95.9 | 5.00 |
| | 1220 | 4350 | 3310 | 93.9 | 91.5 | 5.03 |
| 0.1 | 1200 | 4340 | 3430 | 93.3 | 94.6 | 5.01 |
| | 1220 | 4390 | 3250 | 94.3 | 83.6 | 5.04 |
| 0.2 | 1200 | 4360 | 3410 | 94.1 | 94.3 | 5.01 |
| | 1220 | 4400 | 3230 | 94.6 | 90.1 | 5.04 |
| 0.3 | 1200 | 4400 | 3310 | 95.1 | 96.3 | 5.06 |
| | 1220 | 4450 | 3080 | 95.6 | 91.4 | 5.07 |
| 0.6 | 1200 | 4430 | 3280 | 95.3 | 96.3 | 5.06 |
| | 1220 | 4440 | 3050 | 95.7 | 93.4 | 5.08 |
| 0.9 | 1200 | 4420 | 3330 | 95.6 | 94.7 | 5.05 |
| | 1220 | 4440 | 3140 | 95.7 | 92.4 | 5.07 |
| 1.2 | 1200 | 4360 | 3400 | 95.1 | 91.0 | 5.03 |
| | 1220 | 4430 | 3200 | 95.5 | 89.8 | 5.05 |
| 3.0 | 1200 | 4310 | 3390 | 94.3 | 91.2 | 4.99 |
| | 1220 | 4360 | 3150 | 95.1 | 86.2 | 5.03 |

It is evident from Tables 6 and 7 that even when the amount of the dispersant added was changed over a wide range, molded parts having a high degree of orientation are obtained and as a result, magnets having excellent properties are obtained. It is noted that a sintered part cracked when the amount of calcium gluconate monohydrate added was 3.5% by weight.

Examples 12–13 and Comparative Example 4

Molded parts were obtained as in Example 3 except that the dispersants shown in Table 8 were used and the wet comminution time was 20 hours. These parts were measured as in Example 1, with the results shown in Table 8.

TABLE 8

| | Dispersant | Addition amount (wt %) | Addition stage | Degree of orientation by X-ray of molded part, $\Sigma I(00L)/\Sigma I(hkL)$ |
|---|---|---|---|---|
| CE4 | — | — | — | 0.45 |
| E12 | citric acid monohydrate | 0.9 | wet comminution step | 0.48 |
| E13 | gluconic acid | 1.0 | wet comminution step | 0.50 |

It is evident from Table 8 that the effect of improving a degree of orientation is acknowledged when citric acid was used.

Comparative Examples 5–9

Molded parts were obtained as in Example 3 except that commercially available dispersants used in the concrete industry were used. They were examined for a degree of orientation by X-ray, with the results shown in Table 9.

TABLE 9

| | Dispersant | Addition amount (wt %) | Addition stage | Degree of orientation by X-ray of molded part, $\Sigma I(00L)/\Sigma I(hkL)$ |
|---|---|---|---|---|
| CE5 | polycarboxylic acid | 1.0 | wet comminution step | 0.53 |
| CE6 | methylol melamine condensate | 1.0 | wet comminution step | 0.49 |
| CE7 | sodium ligninsulfonate | 1.0 | wet comminution step | 0.48 |
| CE8 | triazine ring | 1.0 | wet comminution | 0.46 |

TABLE 9-continued

|  | Dispersant | Addition amount (wt %) | Addition stage | Degree of orientation by X-ray of molded part, $\Sigma I(00L)/\Sigma I(hkL)$ |
|---|---|---|---|---|
|  | high condensate |  | step |  |
| CE9 | NSF | 1.0 | wet comminution step | 0.45 |

*NSF: sodium naphthalenesulfonate-formalin high condensate

It is evident from Table 9 that the dispersant used in the concrete industry were little effective for improving the degree of orientation of magnetic material particles. The molded part using the polycarboxylic acid dispersant was slightly improved in the degree of orientation by X-ray. When the molded parts including this were fired, the sintered parts all had a density as low as 4.9 g/cm³ or below.

Example 1

To achieve the desired composition:

$$Sr_{0.8}La_{0.2}Co_{0.2}Fe_{11.8}O_{19},$$

the starting raw materials shown below were used.

| Fe₂O₃ powder (containing Mn, Cr, Si and Cl impurities) | 1000.0 g |
|---|---|
| SrCO₃ powder (containing Ba and Ca impurities) | 130.3 g |
| Cobalt oxide powder | 17.56 g |
| La₂O₃ powder | 35.67 g |
| The following additives were used. | |
| SiO₂ | 2.3 g |
| CaCO₃ | 1.72 g |

The starting raw materials and additives were comminuted in a wet attritor, dried, classified, and then fired in air at 1,250° C. for 3 hours, yielding a granular calcined material.

The calcined material was measured for magnetic properties by means of a vibrating sample magnetometer (VSM), finding a saturation magnetization as of 68 emu/g and a coercive force HcJ of 4.6 kOe.

To the calcined material were added 0.4% by weight of SiO₂ and 1.25% by weight of CaCO₃ and further 0.6% by weight of calcium gluconate as a dispersant. The mixture was subject to dry coarse comminution in a vibrating rod mill with a capacity of 110 g per batch for 20 minutes. At this point, comminution introduced strains into the calcined particles to reduce their HcJ to 1.8 kOe.

The calcined particles were then mixed with water as a dispersing medium to form a slurry to be milled. The slurry to be milled had a solid concentration of 34% by weight.

The slurry to be milled was subject to wet comminution in a ball mill for 40 hours. At the end of wet comminution, a specific surface area of 8.5 m²/g (mean particle size of 0.5 μm) was reached. The supernatant of the slurry at the end of wet comminution was at pH 9 to 10.

After the completion of wet comminution, the milled slurry was centrifuged and adjusted until the concentration of calcined particles in the slurry reached 78% by weight, obtaining a molding slurry. The molding slurry was compression molded while removing water therefrom. This molding was carried out under a magnetic field of about 13 kOe applied in a compression direction. The molded part was a cylindrical one having a diameter of 30 mm and a height of 18 mm. The molded part had a degree of orientation $\Sigma I(00L)/\Sigma I(hkL)$ of 0.6 as measured by X-ray diffractometry.

Next, the molded parts were fired in air at 1,180° C. to 1,240° C. for one hour. It is noted that the molded part was fully burned out at 100 to 360° C. in air to remove the gluconic acid before firing. The sintered parts thus obtained were measured for remanence Br, coercive force HcJ, degree of orientation Ir/Is, squareness ratio Hk/HcJ, and sintered density, with the results shown in Table 10. The results of elemental analysis are shown in Table 11.

TABLE 10

| Firing temp. (° C.) | 4 πIs (kG) | Br (kG) | HcJ (kOe) | Ir/Is (%) | Hk/HcJ (%) | (BH)max (MGOe) | df (g/cm³) |
|---|---|---|---|---|---|---|---|
| 1180 | 4.48 | 4.28 | 4.88 | 95.6 | 89.0 | 4.5 | 5.01 |
| 1200 | 4.52 | 4.33 | 4.61 | 95.8 | 89.5 | 4.6 | 5.06 |
| 1220 | 4.56 | 4.39 | 4.26 | 96.3 | 90.9 | 4.7 | 5.08 |
| 1240 | 4.57 | 4.42 | 3.73 | 96.6 | 39.4 | 3.8 | 5.08 |

TABLE 11

| Composition (at %) | | | | | | | |
|---|---|---|---|---|---|---|---|
| Fe | Sr | Ba | Ca | La | Co | Mn | Si |
| 88.7 | 6.0 | 0.1 | 1.2 | 1.5 | 1.5 | 0.3 | 0.7 |

The effectiveness of the invention is evident from the results of the foregoing Examples.

We claim:

1. A method for preparing an oxide magnetic material comprising wet molding in a magnetic field a molding slurry containing a particulate oxide magnetic material and water to form a molded part, wherein the molding slurry contains a dispersant comprising an organic compound selected from a group consisting of a compound having a hydroxyl group and a carboxyl group or a neutralized salt thereof or a lactone thereof, a compound having a hydroxymethylcarbonyl group, and a compound having an enol form hydroxyl group dissociable as an acid or a neutralized salt thereof;

said organic compound has 3 to 20 carbon atoms; and a different hydroxyl group is attached to each of at least 50% of the carbon atoms which form no double bond with an oxygen atom.

2. A method for preparing an oxide magnetic material according to claim 1, wherein said compound having a hydroxyl group and a carboxyl group is gluconic acid.

3. A method for preparing an oxide magnetic material according to claim 1, wherein said compound having an enol form hydroxyl group dissociable as an acid is ascorbic acid.

4. A method for preparing an oxide magnetic material comprising wet molding in a magnetic field a molding slurry containing a particulate oxide magnetic material and water to form a molded part, wherein the molding slurry comprises citric acid or a neutralized salt thereof as a dispersant.

5. A method for preparing an oxide magnetic material according to any one of claims 1 to 4, further comprising adding a basic compound to said molding slurry.

6. A method for preparing an oxide magnetic material according to any one of claims 1 to 4, wherein said dispersant is a calcium salt.

7. A method for preparing an oxide magnetic material according to claim 1 or 4, further comprising a wet comminution step prior to the wet molding.

8. A method for preparing an oxide magnetic material according to claim 7, wherein at least a portion of said dispersant is added in said wet comminution step.

9. A method for preparing an oxide magnetic material according to claim 7, further comprising a dry coarse comminution step prior to the wet comminution step.

10. A method for preparing an oxide magnetic material according to claim 9, wherein at least a portion of said dispersant is added in said dry coarse comminution step.

11. A method for preparing an oxide magnetic material according to claim 1 or 4, wherein an amount of said dispersant added, calculated as an ion if the dispersant is ionizable in an aqueous solution, is 0.05 to 3.0% by weight of said particulate oxide magnetic material.

12. A method for preparing an oxide magnetic material according to claim 1, wherein said particulate oxide magnetic material has a mean particle size of not greater than 1 μm.

* * * * *